(12) United States Patent
Eto et al.

(10) Patent No.: US 6,916,869 B2
(45) Date of Patent: Jul. 12, 2005

(54) ACRYLIC RESIN PLASTISOL COATING COMPOUND

(75) Inventors: Hirofumi Eto, Ohsato-gun (JP); Osamu Sakai, Ohsato-gun (JP); Akihiro Higuchi, Ohsato-gun (JP); Ayumi Takata, Toyota (JP); Yutaka Ohashi, Nisshin (JP)

(73) Assignees: Asahi Rubber Co., Ltd., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 66 days.

(21) Appl. No.: 10/457,347

(22) Filed: Jun. 10, 2003

(65) Prior Publication Data

US 2003/0232908 A1 Dec. 18, 2003

(30) Foreign Application Priority Data

Jun. 12, 2002 (JP) ........................................ 2002-171125

(51) Int. Cl.$^7$ ............................... C08K 5/29; C08F 8/30
(52) U.S. Cl. ........................ 524/197; 525/124; 525/127
(58) Field of Search ................................ 524/197, 127; 525/124, 127

(56) References Cited

U.S. PATENT DOCUMENTS 5,252,689 A * 10/1993 Lucas et al. ................ 526/227
5,284,918 A * 2/1994 Huynh-Tran et al. ....... 525/124
5,296,551 A * 3/1994 Yukawa et al. ............. 525/175
6,559,193 B2 * 5/2003 Nonoyama et al. ........... 521/95

FOREIGN PATENT DOCUMENTS

| EP | 0 584 572 | 3/1994 |
| EP | 1 158 035 | 11/2001 |
| JP | 2001-59067 | 3/2001 |
| JP | 2001-329208 | 11/2001 |

OTHER PUBLICATIONS

Ayumi Takata, et al., "Post PVC Sound Insulating Underbody Coating", SAE Technical Paper Series, Mar. 4–7, 2002, (–8–pages).

* cited by examiner

*Primary Examiner*—Peter Szekely
(74) *Attorney, Agent, or Firm*—Oblon, Spivak, McClelland, Maier & Neustadt, P.C.

(57) ABSTRACT

An acrylic resin plastisol coating compound which comprises containing therein acrylic resin particles and a self-crosslinking blocked isocyanate prepolymer having blocked isocyanate group and hydroxyl group in the molecule. It is superior in storage stability and workability and gives a coating film with good adhesion and chipping resistance.

15 Claims, No Drawings

ACRYLIC RESIN PLASTISOL COATING COMPOUND

BACKGROUND OF THE INVENTION

The present invention relates to an acrylic resin plastisol coating compound suitable for use as an undercoating material for protection of car bodies or as a sealing material for car bodies.

It has been common practice to apply an undercoating material to the wheel house, floor underside, and lower exterior of an automobile for their protection from chipping (paint film peeling by pebbles hitting against them). Such undercoating materials are mostly based on polyvinyl chloride resin (PVC) and polyvinyl chloride/polyvinyl acetate copolymer resin. In addition, a PVC-based sealing material is applied to panel joints of a car body for dust-and water-proofing.

Unfortunately, the conventional undercoating materials and sealing materials (which are composed mainly of polyvinyl chloride resin or polyvinyl chloride/polyvinyl acetate copolymer resin) are liable to give off, upon combustion, hydrogen chloride, dioxin, etc. detrimental to environments. So, chlorine-free substitutes have been sought for.

A promising substitute for coating compound based on polyvinyl chloride resin is one based on acrylic resin. However, no satisfactory product has been obtained yet which forms coating film with good properties and adhesion required of the undercoating material and sealing material for automotive use.

Improvement of acrylic resin in adhesion to the adherend (car body) was contemplated by incorporation with polyamide resin. However, the result was poor storage stability and insufficient adhesion of the coating compound.

Another way to improve adhesion is by incorporation with blocked isocyanate. This adhesion improver poses no problem with storage stability; however, conventional blocked isocyanate intended for PVC-based coating compounds does not provide sufficient adhesion. Moreover, the coating compound containing such blocked isocyanate has the disadvantage that the resulting coating film suffers interfacial failure between electrodeposited plate and coating film before it is broken by abrasion in the abrasion test such as nut-ropping test involving continuous weak shocks. Thus, it does not meet the requirements.

In general, any adhesion improver is more effective according as its molecular weight increases. However, any adhesion improver with a high molecular weight is viscous per se, and hence it deteriorates the workability of the coating compound containing it. Although it is possible to improve the workability by increasing the amount of plasticizer, the additional plasticizer deteriorates adhesion and characteristic properties.

SUMMARY OF THE INVENTION

It is an object of the present invention to provide an acrylic resin plastisol coating compound which exhibits good storage stability and workability and forms a coating film with good adhesion and good chipping resistance.

In order to achieve the above-mentioned object, the present inventors carried out a series of researches, an acrylic resin plastisol coating compound comprising acrylic resin particles and a self-crosslinking blocked isocyanate prepolymer having blocked isocyanate groups and hydroxyl groups in the molecule as specifically represented by the general formula (1) below:

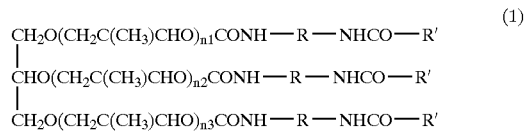

(where R denotes a divalent aromatic group and R' all or partly denotes a polyol residue which is formed by addition to the NCO group represented by the general formula (2) below:

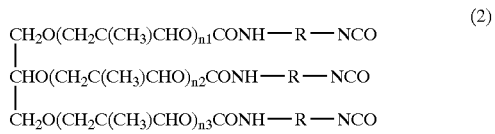

(where R is defined as above.)
of an aminopolyether polyol represented by the general formula (3) below:

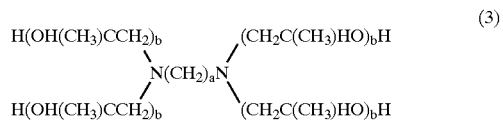

(where n1, n2, and n3 are integers of 1 to 50, and a is an integer of 1 to 12 and b is an integer of 1 to 7.)
with the remainder being blocking groups formed by addition of blocking agents to the above-mentioned NCO groups.) exhibits good storage stability and workability and forms a coating film with good adhesion and good chipping resistance.

In other words, the self-crosslinking blocked isocyanate prepolymer has in its molecular chain blocked isocyanate groups and hydroxyl groups, so that at the time of baking the blocked isocyanate groups releases the blocking agent to form NCO groups which react with the hydroxyl groups. This reaction causes the molecules of the self-crosslinking blocked isocyanate prepolymer (as the adhesion improver) to combine with one another and entangle with the molecules of the acrylic resin (as the base resin), thereby forming giant molecules that contribute to adhesion. In addition, the self-crosslinking blocked isocyanate prepolymer is stable during storage at normal temperature because the NCO groups therein are masked by the blocking agent and prevented from reaction with the hydroxyl groups. Before baking, it remains intact and hence has an adequate degree of viscosity to ensure good workability for the acrylic resin plastisol coating compound. After baking, it gives a coating film which exhibits good chipping resistance, and the coating film does not suffer interfacial failure in the continuous abrasion test such as nut dropping test.

Thus, the present invention is directed to an acrylic resin plastisol coating compound which comprises containing therein acrylic resin particles and a self-crosslinking blocked isocyanate prepolymer having blocked isocyanate group and hydroxyl group in the molecule.

DESCRIPTION OF THE PREFERRED EMBODIMENTS

The invention will be described in more detail as follows. According to the present invention, the acrylic resin plastisol coating compound contains acrylic resin particles and a self-crosslinking blocked isocyanate prepolymer having blocked isocyanate groups and hydroxyl groups in the molecule.

The acrylic resin particles may be any known ones which are usually used for acrylic resin plastisol. They include those of polymer or copolymer polymerized from such monomer as alkyl ester of acrylic or methacrylic acid. Examples of the monomer include methyl (meth)acrylate, ethyl (meth)acrylate, n-utyl (meth)acrylate, and isobutyl (meth)acrylate.

Acrylic resin particles of core/shell structure are preferable from the standpoint of the characteristic properties and storage stability of the coating compound. The core of such particles should preferably be formed from a homopolymer or copolymer of alkyl acrylate or hydroxyalkyl acrylate having no less than 2 (preferably 3) carbon atoms or alkyl methacrylate or hydroxyalkyl methacrylate having no less than 3 carbon atoms. The core of the particles should also preferable be formed from a copolymer such (meth)acrylate and any of (meth)acrylic acid, maleic acid, itaconic acid, and styrene for better compatibility with plasticizer.

The shell of such particles should preferably be formed from a homopolymer of methyl methacrylate or a copolymer composed of methyl methacrylate units (80 wt % or above) and any of alkyl (meth)acrylate, hydroxyalkyl (meth) acrylate, (meth)acrylic acid, maleic acid, itaconic acid, and styrene. The shell should be incompatible with plasticizer. Thus, the shell protects the core from attack by plasticizer until it is melted by heating at a high temperature. After the shell has melted away, the core readily dissolves in plasticizer. Consequently, the coating compound exhibits good characteristic properties and storage stability.

Incidentally, the acrylic resin particles are not specifically restricted in average particle diameter; however, they should preferably have an average particle diameter of 0.1–100 μm, particularly 0.1–40 μm.

According to the present invention, the coating compound contains a self-crosslinking blocked isocyanate prepolymer having blocked isocyanate group and hydroxyl group in the molecule.

The present invention requires that the self-crosslinking blocked isocyanate prepolymer have at least one blocked isocyanate group and at least one hydroxyl group in its molecule. In other words, the isocyanate prepolymer as a precursor has its isocyanate groups (NCO groups) blocked partly or entirely by aminopolyether polyol, with the remainder being blocked by any of alcohol, phenol, oxime, caprolactam, amine, and active methylene compound.

The self-crosslinking blocked isocyanate prepolymer functions as an adhesion improver. While the coating film is being baked, it releases the blocking agent, thereby crosslinking itself through reaction between NCO group and OH group, and it also causes its molecules to entangle with the molecules of the acrylic resin as the base resin, thereby forming giant molecules. These giant molecules make the coating film firmly adhere to the adherend. The isocyanate prepolymer and the acrylic resin produce a synergistic effect of improving the performance of coating film, especially cold resistance which is a weak point of acrylic resin. Improved cold resistance imparts high elongation to the coating film at low temperatures.

The self-crosslinking blocked isocyanate prepolymer is specifically represented by the general formula (1) below:

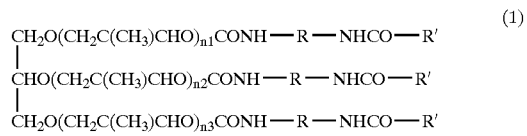

(where R denotes a divalent aromatic group (preferably tolylene group) and R' all or partly denotes a polyol residue which is formed by addition to the NCO group represented by the general formula (2) below:

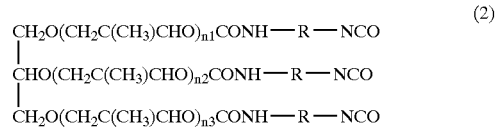

(where R is defined as above.)
of an aminopolyether polyol represented by the general formula (3) below:

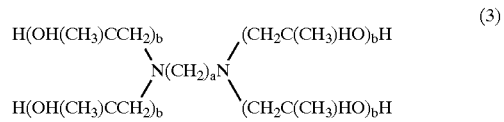

(where n1, n2, and n3 are integers of 1 to 50 (preferably 1 to 30), and a is an integer of 1 to 12 (preferably 1 to 8, most preferably 2) and b is an integer of 1 to 7 (preferably 1 to 5, most preferably 1, especially n1, n2, and n3 are an integer that satisfies n1+n2+n3=50.) with the remainder being blocking groups formed by addition of blocking agents to the above-mentioned NCO groups.)

In the general formula (1) and (2), a preferred example of the divalent aromatic group represented by R is formed from isocyanate such as toluene diisocyanate (TDI), diphenylmethane diisocyanate (MDI), naphthylene diisocyanate (NDI), or xylylene diisocyanate (XDI), particularly, toluene diisocyanate such as 2,4-TDI and 2,6-TDI, and the NCO groups in the prepolymer represented by the general formula (2) are partly or entirely blocked by aminopolyether polyol (such as an adduct of N-polyoxypropylene ethylenediamine) represented by the general formula (3), with the remainder being blocked by any other blocking agent.

The blocking agent mentioned above may be any known one which has been used to block the NCO group. In order that it releases itself at the baking temperature of coating film, it should be selected one or more kind of blocking agent from alcohol, phenol, oxime, caprolactam, amine, active methylene compound, or the like, with oxime being preferable. Of these compounds, those which are capable of dissociation at low temperatures (below 140° C., particularly below 120° C.) are desirable. Their examples include methylethylketoxime, t-butylphenol (and other $C_{1-4}$ alkyl phenols), ethyl acetoacetate, and dicyclohexylamine (and other dicyloalkylamines).

The self-crosslinking blocked isocyanate prepolymer may be obtained by a series of reactions as follows. First, an isocyanate compound, such as tolylenediisocyanate (2,4-TDI), is reacted with a polyether polyol (an adduct of glycerin with propylene oxide) in the presence of dibutyltin dilaurate (catalyst) to give an isocyanate prepolymer. Second, the prepolymer is reacted with a blocking agent, such as methylethylketoxime. Third, the blocked prepolymer is reacted with an aminopolyether polyol, such as N-polyoxypropylene ethylenediamine (an adduct of ethylenediamine with propylene oxide).

The thus obtained self-crosslinking blocked isocyanate prepolymer may contain some unreacted adducts. Such residual adducts function as a crosslinking agent for the isocyanate prepolymer when the coating film is baked.

The self-crosslinking blocked isocyanate prepolymer according to the present invention may be used in the form of a mixture with a blocked isocyanate prepolymer in which all the NCO groups are blocked by the blocking agent only, without aminopolyether polyol added thereto.

The amount of the self-crosslinking blocked isocyanate prepolymer in the coating compound should preferably be 10–200 pbw, particularly 30–100 pbw, for 100 pbw of the acrylic resin. An excessively small amount tends to make the coating film poor in adhesion; and an excessively large amount tends to make the coating compound poor in workability due to high viscosity. Incidentally, the self-crosslinking blocked isocyanate prepolymer may be used alone or more than one kind thereof in combination.

In addition, the self-crosslinking blocked isocyanate prepolymer should preferably have an average molecular weight of 3,000–100,000, particularly 3,500–30,000. An excessively small molecular weight leads to poor adhesion, and an excessively large molecular weight leads to high viscosity. The blocking agent should preferably have a dissociation temperature in the range of 100–140° C., particularly 100–120° C. A dissociation temperature lower than 100° C. leads to poor stability and a dissociation temperature higher than 140° C. leads to poor adhesion (due to incomplete decomposition that occurs at unevenly heated parts at the time of baking).

The coating compound of the present invention may be incorporated with any organic or inorganic blowing agent, particularly one which decomposes at 130–180° C. (especially 130–140° C.) coinciding with the ordinary drying/baking temperature in production of undercoated steel sheets for automobiles. The blowing agents may be used in combination with one another or with a blowing auxiliary. Any blowing agent with a decomposition temperature higher than 180° C. does not blow as desired at 120–160° C. Any blowing agent with a decomposition temperature lower than 130° C. prematurely expands before curing, resulting in a coating film with inadequate expansion. It also tends to make the coating compound poor in storage stability.

Examples of the blowing agent include organic ones (such as azo compounds, nitroso compounds, hydrazine compounds, and derivatives thereof) and inorganic ones (such as bicarbonate). Their specific examples include 4,4'-oxybisbenzenesulfonylhydrazide (OBSH), p-toluenesulfonylazide, and p-methylurethanebenzenesulfonylhydrazide. A combination of OBSH and azodicarbonamide (ADCA) is desirable as a blowing agent. Incidentally, although ADCA has a decomposition temperature higher than 180° C. when used alone, it decreases in decomposition temperature to 130–180° C. when used in combination with an adequate blowing auxiliary. A blowing agent (such as OBSH) or a mixture of blowing agents may be used in combination with a blowing auxiliary, as long as the decomposition temperature remains at 130–180° C.

Any known blowing auxiliary may be used, which includes metal oxides (such as zinc oxide and magnesium oxide), metal soaps (such as zinc stearate), urea compounds, and amines. These blowing agents may also be used for other purposes. For example, a metal soap may be used as a surface treating agent for an inorganic filler (such as calcium carbonate). A metal soap used as a surface treating agent may be regarded as a blowing auxiliary so long as it lowers the decomposition temperature of the blowing agent.

The blowing agent mentioned above should be used sparingly so that the coating compound will not absorb much moisture. Its adequate amount is less than 15 pbw for 100 pbw of acrylic resin particles (as the base material). There is no specific lower limit; however, an adequate amount should be selected so that an expanding ratio of 2.0–3.5 times is achieved.

The coating compound of the present invention may be incorporated with any crosslinking agent which reacts with NCO groups or OH groups at the time of baking the coating film. The one which reacts with NCO groups include those compounds containing active hydrogen, such as hydroxyl groups, amino groups, hydrazide groups, and mercapto groups. The one which reacts with OH groups include those compounds containing isocyanate groups, chlorosulfonate groups, and epoxy groups.

Incidentally, the coating compound would become poor in storage stability if a liquid polyamide amine is used as the amino group-containing crosslinking agent. To address this problem, it should be used in combination with an amine- or hydrazine-based latent curing agent which is an inactive powder at normal temperature but becomes an active melt upon heating.

The coating compound of the present invention should preferably be incorporated further with any known plasticizer. Examples of the plasticizer include phthalate esters, phosphate esters, adipate esters, and sebacate esters. Typical phthalate esters are dimethyl phthalate (DMP), diethyl phthalate (DEP), dibutyl phthalate (DBP), dihexyl phthalate (DHP), di-2-ethylhexyl phthalate (DOP), diisodecyl phthalate (DIDP), butylbenzyl phthalate (BBP), diisononyl phthalate (DINP), and dinonyl phthalate (DNP). Typical phosphate esters are tricresyl phosphate (TCP) and trixylene phosphate (TXP). Typical adipate esters are dioctyl adipate (DOA) and diisodecyl adipate (DIDA). Typical sebacate esters are dibutyl sebacate (DBS) and dioctyl sebacate (DOS). Of these examples, phthalate ester plasticizers are more desirable. They may be used alone or in combination with one another.

The amount of the plasticizer should preferably be 80–200 pbw, particularly 100–180 pbw, for 100 pbw of acrylic resin. Insufficient plasticizer leads to less flexible coating film, and excess plasticizer leads to sticky coating film.

The coating compound of the present invention may optionally be incorporated with a solvent, such as paraffinic, naphthenic, and aromatic hydrocarbon with a boiling point of 150–250° C., for its improvement in spray workability. The amount of the solvent should be 0–50 pbw, preferably 5–50 pbw, more preferably 10–40 pbw, for 100 pbw of the acrylic resin. Excess solvent (more than 50 pbw) will evaporate during baking, causing cracking and foaming to the coating film.

The coating compound of the present invention should preferably be incorporated with filler, for example, an inorganic filler such as calcium carbonate, barium sulfate, clay, diatomaceous earth, silica, and talc. They may be used alone or in combination with one another. It is also possible to add hollow particles, such as glass balloons and resin balloons, or heat-expanding resin balloons.

The amount of the filler should preferably be 50–300 pbw, particularly 70–150 pbw, for 100 pbw of the acrylic resin. Insufficient filler makes the coating compound poor in flow and delivery at the time of spray coating. Excess filler leads to coating film with poor physical properties (low flexibility).

The coating compound of the present invention may optionally be incorporated with 0–20 pbw, particularly 0–10 pbw, of fumed silica for 100 pbw of the acrylic resin, in order to impart antisagging properties and thixotropic properties. Moreover, it may also be incorporated with 0–100 pbw, particularly 20–80 pbw, of flame retardant (such as aluminum hydroxide and magnesium hydroxide) for 100 pbw of the acrylic resin, and it may also be incorporated with 0–50 pbw, particularly 5–20 pbw, of moisture-preventing agent (such as calcium oxide), for 100 pbw of the acrylic resin.

The coating compound of the present invention may be prepared in any manner without specific restrictions. It can be prepared by thoroughly mixing the above-mentioned essential and optional components in any known mixer (such as kneader and roll).

The acrylic resin plastisol coating compound of the present invention can be formed into an acrylic gel coating compound upon gelation. Gelation is accomplished by heating at about 70–240° C. for 2 minutes to 2 hours in accordance with the composition of the acrylic resin plastisol and the condition of the specific operation.

The acrylic resin plastisol coating compound of the present invention is superior in storage stability and workability and gives a coating film superior in adhesion and chipping resistance. In addition, being free of halogens (such as chlorine) and other harmful substances, it is environmentally sound and superior to PVC-based coating compounds in performance.

The acrylic resin plastisol coating compound of the present invention will find use as an undercoating material and a sealing material for cars, trucks, and busses, the former being applied to the wheel house, floor underside, and body exterior for their chipping and rusting resistance and sound proofing, the latter being applied to the panel joints of the car body for dust- and water-proofing.

The coating compound of the present invention may be applied, dried, and baked in any known manner. The baking (curing) temperature of the coating film should preferably be 120–180° C., particularly 130–160° C. The thickness of the coating film should be adequately selected according to the purpose of coating. For use as high-performance non-foaming thin undercoating, a desirable thickness is 0.2–1.0 mm, particularly 0.3–0.5 mm. For use as foamed undercoating (with a blowing agent and/or heat-expanding resin balloons), a desirable thickness is 1–6 mm, particularly 1–4 mm, with a foaming ratio of 1.1–3.5 times, particularly 1.4–3.0 times.

EXAMPLES

The invention will be described in more detail with reference to the following examples, which are not intended to restrict the scope thereof.

Examples 1 to 4 and Comparative Examples 1 to 6

Samples of foamable acrylic resin plastisol coating compound were prepared from the components shown in Table 1. The resulting coating compound was applied to a substrate to form a wet coating film with a prescribed thickness (in wet state). The wet coating film was baked under prescribed conditions, and the resulting coating film was evaluated.

The blocked isocyanate as one of the components was selected from the following four products.

Self-crosslinking Blocked Isocyanate Prepolymer (Formed by Addition of N-polyoxypropylene-ethylenediamine to a TDI-based Blocked Isocyanate Prepolymer) (1)
Method of Production:

A flask equipped with a stirrer, thermometer, and nitrogen gas inlet was charged with 174 pbw of tolylene diisocyanate (2,4-TDI), 1000 pbw of polyether polyol (having an average molecular weight of 3000, formed from one equivalent of glycerin and 50 equivalents of propylene oxide added thereto), and 0.3 pbw of dibutyltin dilaurate (as a catalyst). Reaction was carried out by stirring under a nitrogen stream, with the reactants kept at 50–80° C., to give a urethane prepolymer. This urethane prepolymer was made into a blocked urethane prepolymer by reaction (at 30–50° C.) with methylethylketoxime as a blocking agent (84 pbw (96.5% equivalent)), which was added dropwise. This blocked urethane prepolymer was incorporated with 73 pbw of aminopolyether polyol (an adduct of one equivalent of ethylenediamine with four equivalents of propylene oxide). Reaction was carried out by heating at 50–80° C. until the reaction product became free of isocyanate groups, which was known from disappearance of the peak (at 2260 cm$^{-1}$) due to isocyanate groups from the infrared absorption spectrum. Thus there was obtained the desired self-crosslinking blocked isocyanate prepolymer.

NCO content: 3.6%; average molecular weight: ca. 3,000
Blocked Isocyanate Trimer (HDI-based Blocked Isocyanate Trimer, Isocyanurate Type) (2)

B8-895D, a commercial product from Dainippon Ink and Chemicals, Incorporated.
Blocked Isocyanate (TDI-based Blocked Isocyanate Prepolymer), Conventional Product-1 (3)
Method of Production:

A flask equipped with a stirrer, thermometer, and nitrogen gas inlet was charged with polypropylene glycol, TDI, and dibutyltin dilaurate (as a catalyst). Reaction was carried out, with the reactants kept at 40–80° C. for 3 hours. The resulting urethane prepolymer was blocked with methylethylketoxime at 30–50° C. Reaction was continued until the peak (at 2260 cm$^{-1}$) disappeared from the infrared absorption spectrum.

NCO content: 3.6%; average molecular weight: ca. 3,500
Blocked Isocyanate (TDI-based Blocked Isocyanate Prepolymer: Self-Crosslinking Isocyanate Without the Adduct of N-polyoxy-propylene Ethylenediamine), Conventional Product-2 (4)
Method of Production:

A flask equipped with a stirrer, thermometer, and nitrogen gas inlet was charged with 174 pbw of tolylene diisocyanate (2,4-TDI), 1000 pbw of polyether polyol (having an average molecular weight of 3000, formed from one equivalent of glycerin and 50 equivalents of propylene oxide added thereto), and 0.3 pbw of dibutyltin dilaurate (as a catalyst). Reaction was carried out by stirring under a nitrogen stream, with the reactants kept at 50–80° C., to give a urethane prepolymer. This urethane prepolymer was made into a blocked urethane prepolymer by reaction (at 30–50° C.) with methylethylketoxime as a blocking agent (87 pbw (100% equivalent)), which was added dropwise. Reaction was continued until the peak (at 2260 cm$^{-1}$) disappeared from the infrared absorption spectrum.

NCO content: 3.6%; average molecular weight: ca. 3,000

Samples of the thus obtained coating compound were evaluated for viscosity, storage stability, adhesion of coating film, and chipping resistance of coating film in the following manner. The results are shown in Table 1.
Storage Stability:

Each sample was tested for viscosity after storage in a stoppered glass bottle at 35° C. for 10 days.
○: increase in viscosity by less than 30%
X: increase in viscosity by 30% or more Adhesion (Shear Test):

Each sample was applied to one side of an electrocoated steel sheet (25 mm wide). Two pieces of the steel sheet were bonded together with spacers interposed between them such that a layer of undercoating, measuring 25 mm square and 3 mm thick, was formed between them. After baking at 130° C. for 20 minutes, there was obtained a specimen for shear test. The specimen was stretched at a pulling rate of 50 mm/min by using a universal testing machine. The undercoating was inspected for failure. Failure is indicated as follows.

CF: cohesive failure
AF: adhesive failure

Incidentally, percentage (%) means the ratio of the area in which adhesive failure occurred to the total area of 25 mm square.

Chipping Resistance:

Each sample was applied to an electrocoated steel sheet so that the coating film became 0.4 mm thick after drying. The coating film was baked at 130° C. for 20 minutes. The thus obtained specimen (with the coating film upward) was held inclined 60 degrees from the horizontal. The coating film was hit repeatedly with M-4 nuts (defined in JIS) which were dropped through a vertical PVC pipe (2° m long and 20 mm in inside diameter), with its lower end kept close to the coating film. The dropping of nuts was continued until the substrate was exposed, and the total weight of dropped nuts was measured.

It is noted from Table 1 that the acrylic resin plastisol coating compounds in Examples exhibit good characteristic properties.

The acrylic resin plastisol coating compounds according to the present invention is superior in storage stability and workability and gives a coating film with good adhesion and chipping resistance.

What is claimed is:

1. An acrylic resin plastisol coating compound, comprising:
   acrylic resin particles, and
   a self-crosslinking blocked isocyanate prepolymer having a blocked isocyanate group and a hydroxyl group in the molecule.

2. The acrylic resin plastisol coating compound, comprising:
   acrylic resin particles, and
   a self-crosslinking blocked isocyanate prepolymer represented by the general formula (1) below:

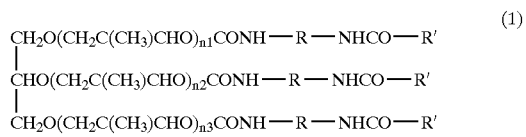

wherein
R denotes a divalent aromatic group, and
R' all or partly denotes a polyol residue which is formed by addition to the NCO group represented by the

TABLE 1

|  | Examples | | | | Comparative Examples | | | | | |
|---|---|---|---|---|---|---|---|---|---|---|
|  | 1 | 2 | 3 | 4 | 1 | 2 | 3 | 4 | 5 | 6 |
| Acrylic resin | 100 | 100 | 100 | 100 | 100 | 100 | 100 | 100 | 100 | 100 |
| Self-crosslinking blocked isocyanate prepolymer (1) | 60 | 70 | 80 | 100 | | | | | | |
| Blocked isocyanate trimer (2) | | | | | 70 | 80 | | | | |
| Blocked isocyanate prepolymer (conventional product-1) (3) | | | | | | | 70 | 80 | | |
| Blocked isocyanate prepolymer (conventional product-2) (4) | | | | | | | | | 80 | |
| Polyamide resin | | | | | | | | | | 15 |
| Blowing agent | | | | | | | | | | |
| Plasticizer | 160 | 160 | 160 | 160 | 160 | 160 | 160 | 160 | 160 | 160 |
| Filler | 117 | 117 | 117 | 117 | 117 | 117 | 117 | 117 | 117 | 117 |
| Calcium oxide | 0.5 | 0.5 | 0.5 | 0.5 | 0.5 | 0.5 | 0.5 | 0.5 | 0.5 | 0.5 |
| Carbon black | 0.5 | 0.5 | 0.5 | 0.5 | 0.5 | 0.5 | 0.5 | 0.5 | 0.5 | 0.5 |
| Viscosity (Pa · s) | 8.2 | 9.7 | 11.7 | 13.7 | 10.2 | 13.4 | 15.1 | 18.4 | 11.2 | 11.5 |
| Storage stability | ○ | ○ | ○ | ○ | ○ | ○ | ○ | ○ | ○ | X (cured) |
| Adhesion | 50% AF | CF | CF | CF | AF | AF | AF | 70% AF | AF | AF |
| Chipping resistance (weight of nuts), kg | 28 | 46 | 62 | 70 | 6 | 6 | 21 | 34 | 23 | 10 |

Acrylic resin: core/shell type; average molecular weight: 750,000; average particle diameter: 0.5 μm, polyamide resin: Versamide 140 (from Henkel Japan Ltd.)
Blowing agent: ADCA-based one, with a urea compound as a blowing auxiliary
Plasticizer: diisononyl phthalate
Filler: neolite SP (from Takehara Kagaku Kogyo Co., Ltd.)

general formula (2) below:

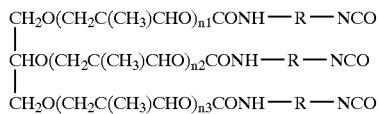 (2)

wherein R is defined as above of an aminopolyether polyol represented by the general formula (3) below:

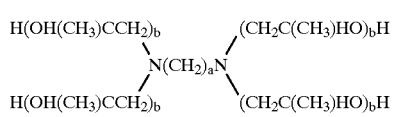 (3)

wherein
n1, n2, and n3 are integers of 1 to 50,
a is an integer of 1 to 12, and
b is an integer of 1 to 7
with the remainder being blocking groups formed by addition of blocking agents to the above-mentioned NCO groups.

3. The acrylic resin plastisol coating compound as defined in claim 2, wherein the blocking agent is at least one member selected from the group consisting of an alcohol, a phenol, an oxime, a caprolactam, an amine, and an active methylene compound and mixtures thereof.

4. The acrylic resin plastisol coating compound as defined in claim 1, comprising at least one member selected from the group consisting of a blowing agent, a plasticizer, a filler and mixtures thereof.

5. An undercoating material for automobiles, comprising: the acrylic resin plastisol coating compound as defined in claim 1.

6. A sealing material for automotive panels, comprising: the acrylic resin plastisol coating compound as defined in claim 1.

7. The acrylic resin plastisol coating compound as defined in claim 2, further comprising at least one member selected from the group consisting of a blowing agent, a plasticizer, a filler and mixtures thereof.

8. An undercoating material for automobiles, comprising: the acrylic resin plastisol coating compound as defined in claim 2.

9. A sealing material for automotive panels, comprising: the acrylic resin plastisol coating compound as defined in claim 2.

10. An acrylic resin plastisol coating compound, comprising:
acrylic resin particles, and
a self-crosslinking blocked isocyanate prepolymer having a blocked isocyanate group and a hydroxyl group in its molecule,
wherein the isocyanate group is blocked party or entirely by aminopolyether polyol, with the remainder being blocked by a blocking agent.

11. The acrylic resin plastisol coating compound as defined in claim 10, wherein the aminopolyether polyol is represented by the general formula (3) below:

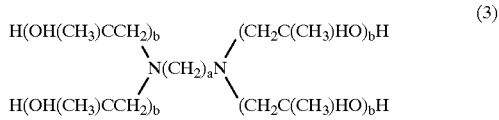 (3)

wherein
n1, n2, and n3 are integers of 1 to 50,
a is an integer of 1 to 12, and
b is an integer of 1 to 7.

12. The acrylic resin plastisol coating compound as defined in claim 10, wherein the blocking agent is at least one member selected from the group consisting of an alcohol, a phenol, an oxime, a caprolactam, an amine, an active methylene compound and mixtures thereof.

13. The acrylic resin plastisol coating compound as defined in claim 10, further comprising at least one member selected from the group consisting of a blowing agent, a plasticizer, a filler and mixtures thereof.

14. An undercoating material for automobiles, comprising:
the acrylic resin plastisol coating compound as defined in claim 10.

15. A sealing material for automotive panels, comprising:
the acrylic resin plastisol coating compound as defined in claim 10.

* * * * *